United States Patent
Neishi et al.

(10) Patent No.: US 10,808,304 B2
(45) Date of Patent: *Oct. 20, 2020

(54) STEEL FOR INDUCTION HARDENING

(71) Applicant: Nippon Steel & Sumitomo Metal Corporation, Tokyo (JP)

(72) Inventors: Yutaka Neishi, Tokyo (JP); Akira Shiga, Tokyo (JP); Kei Miyanishi, Tokyo (JP)

(73) Assignee: Nippon Steel Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/316,479

(22) PCT Filed: Jul. 19, 2017

(86) PCT No.: PCT/JP2017/026002
§ 371 (c)(1),
(2) Date: Jan. 9, 2019

(87) PCT Pub. No.: WO2018/016502
PCT Pub. Date: Jan. 25, 2018

(65) Prior Publication Data
US 2019/0300992 A1    Oct. 3, 2019

(30) Foreign Application Priority Data

Jul. 19, 2016  (JP) ................. 2016-141885

(51) Int. Cl.
*C22C 38/28* (2006.01)
*C22C 38/00* (2006.01)
(Continued)

(52) U.S. Cl.
CPC ............. *C22C 38/28* (2013.01); *C22C 38/00* (2013.01); *C22C 38/001* (2013.01);
(Continued)

(58) Field of Classification Search
None
See application file for complete search history.

(56) References Cited

U.S. PATENT DOCUMENTS

| | | |
|---|---|---|
| 2007/0000582 A1 | 1/2007 | Matsuzaki et al. |
| 2016/0151832 A1 | 6/2016 | Miyazaki et al. |

(Continued)

FOREIGN PATENT DOCUMENTS

| | | |
|---|---|---|
| CN | 1802446 A | 7/2006 |
| CN | 105121680 A | 12/2015 |

(Continued)

OTHER PUBLICATIONS

English language machine translation of JP 2004183016 (equivalent to JP 4014042). Generated Feb. 27, 2020. (Year: 2020).*

(Continued)

*Primary Examiner* — Brian D Walck
(74) *Attorney, Agent, or Firm* — Banner & Witcoff, Ltd.

(57) ABSTRACT

A steel for induction hardening according to the present invention includes a chemical composition consisting of, in mass percent: C: 0.58 to 0.68%, Si: 0.70 to 1.40%, Mn: 0.20 to 1.40%, Al: 0.005 to 0.060%, N: 0.0020 to 0.0080%, and Ca: 0.0005 to 0.005%, with the balance being Fe and impurities, and satisfies Formulae (1) to (3). The steel microstructure is made up of ferrite and by area fraction, 85% or more of pearlite. In the steel, a ratio of a number of composite inclusions to a total number of $Al_2O_3$ inclusions and the composite inclusions that contain 2.0% or more of $SiO_2$ and 2.0% or more of CaO is 20% or more.

$$C+Si/7+Mn/5+Cr/9+Mo/2.5 \leq 1.05 \quad (1)$$

$$C+Si/10+Mn/20+Cr/25 \geq 0.70 \quad (2)$$

$$Cr/Si \leq 0.20 \quad (3)$$

4 Claims, 2 Drawing Sheets

(51) Int. Cl.
    *C22C 38/02*     (2006.01)
    *C22C 38/04*     (2006.01)
    *C22C 38/06*     (2006.01)
    *C22C 38/20*     (2006.01)
    *C22C 38/22*     (2006.01)
    *C22C 38/26*     (2006.01)
    *C22C 38/32*     (2006.01)
    *C22C 38/38*     (2006.01)
    *C22C 38/42*     (2006.01)
    *C22C 38/44*     (2006.01)
    *C22C 38/46*     (2006.01)
    *C22C 38/50*     (2006.01)
    *C22C 38/54*     (2006.01)
    *C21D 1/06*     (2006.01)
    *C21C 7/00*     (2006.01)

(52) U.S. Cl.
    CPC ............ C22C 38/002 (2013.01); C22C 38/02 (2013.01); C22C 38/04 (2013.01); C22C 38/06 (2013.01); C22C 38/20 (2013.01); C22C 38/22 (2013.01); C22C 38/32 (2013.01); C22C 38/42 (2013.01); C22C 38/54 (2013.01); *C21C 7/00* (2013.01); *C21D 1/06* (2013.01); *C21D 2211/004* (2013.01); *C21D 2211/005* (2013.01); *C21D 2211/009* (2013.01)

(56) References Cited

U.S. PATENT DOCUMENTS

2019/0153574 A1*   5/2019   Shiga ................... C22C 38/20
2019/0241997 A1*   8/2019   Neishi ................... C22C 38/44
2019/0300993 A1* 10/2019   Neishi ................... C22C 38/54
2019/0300994 A1* 10/2019   Miyanishi ............ C22C 38/002

FOREIGN PATENT DOCUMENTS

EP        2003221 A1 * 12/2008 ............. C22C 38/06
JP        4014042 B2     11/2007
JP        5742801 B2      7/2015

OTHER PUBLICATIONS

English Abstract of JP4014042B2.
English Abstract of JP5742801B2.

* cited by examiner

STEEL FOR INDUCTION HARDENING

TECHNICAL FIELD

The present invention relates to steel, and more particularly to steel for induction hardening.

BACKGROUND ART

Machine components as represented by toothed gears are usually required to have excellent surface fatigue strengths. As a surface hardness is higher, an excellent surface fatigue strength can be obtained. For that reason, machine components required to have a surface fatigue strength may be produced by induction hardening.

An example of a method for producing such machine components is as follows. Hot forging is performed on a steel material for induction hardening to produce an intermediate product. Induction hardening is performed on the intermediate product. Grinding machining is performed on the intermediate product subjected to the induction hardening, thereby producing a machine component as represented by a toothed gear.

Techniques for improving a fatigue strength of the above machine component are proposed in Japanese Patent No. 4014042 (Patent Literature 1) and Japanese Patent No. 5742801 (Patent Literature 2).

A steel bar for induction hardening disclosed in Patent Literature 1 consists of, in mass percent, C: 0.5 to 0.7%, Si: 0.1 to 1.5%, Mn: 0.2 to 1.5%, Cr: 0 to 1.5%, V: 0 to 0.10%, S: 0.002 to 0.05%, Al: 0.01 to 0.04%, and N: 0.005 to 0.012%, with the balance being Fe and impurities, wherein, in the impurities, Ti is 0.003% or less, O is 0.0015% or less, P is 0.02% or less, and a value X represented by Formula (1) is 0.62 to 0.90. In the outer-layer region of this steel bar, a number of inclusions other than MnS is 2/mm² or less, the inclusions each having a value A represented by Formula (2) of 0.80 or more, an aspect ratio of 3 or less, and a minor axis of 10 μm or more. Here, Formula (1) is X=C (%)+0.11×Si (%)+0.07×Mn (%)+0.08×Cr (%). Formula (2) is A=($Mn_{MIN}$/$Mn_{AVE}$). In Formula (1), C (%), Si (%), Mn (%), and Cr (%) mean contents of respective elements (mass percent). In Formula (2), $Mn_{MIN}$ means a lower-limit value of a concentration of Mn in an outer-layer region (mass percent), and $Mn_{AVE}$ means an average value of the concentration of Mn (mass percent).

A hot-rolled steel bar or a hot-rolled wire rod disclosed in Patent Literature 2 has a chemical composition consists of, in mass percent, C: 0.55 to 0.75%, Si: 0.1 to 1.0%, Mn: 0.3 to 1.5%, Cr: 0.1 to 2.0%, S: 0.002 to 0.05%, Al: 0.01 to 0.2%, and N: 0.002 to 0.01%, the balance being Fe and impurities of which P and O are P: 0.025% or less and O: 0.002% or less, respectively, and making Fn1 represented by the following Formula (1) 2.5 to 4.5. In its structure, a fraction of pearlite is 90% or more, an average distance between pearlite lamellae is 150 to 300 nm, and a standard deviation of the distances between the pearlite lamellae is 25 nm or less. Formula (1) is Fn1=3Si+Mn+1.5Cr, where symbols of elements mean contents of the respective elements (mass percent).

CITATION LIST

Patent Literature

Patent Literature 1: Japanese Patent No. 4014042
Patent Literature 2: Japanese Patent No. 5742801

SUMMARY OF INVENTION

Technical Problem

The steel materials proposed in Patent Literature 1 and Patent Literature 2 can provide excellent surface fatigue strengths. However, it is preferable if excellent surface fatigue strengths of steel materials subjected to the induction hardening can also be provided by other methods.

An objective of the present invention is to provide steel for induction hardening that provides an excellent surface fatigue strength after induction hardening.

Solution to Problem

A steel for induction hardening according to the present invention includes a chemical composition consisting of, in mass percent: C: 0.58 to 0.68%, Si: 0.70 to 1.40%, Mn: 0.20 to 1.40%, Al: 0.005 to 0.060%, N: 0.0020 to 0.0080%, Ca: 0.0005 to 0.005%, Cr: 0 to 0.15%, Cu: 0 to 0.50%, Ni: 0 to 0.30%, Mo: 0 to 0.20%, B: 0 to 0.0040%, and Ti: 0 to 0.050%, with the balance being Fe and impurities, the impurities including: P: less than 0.020%, S: less than 0.020%, O: 0.0015% or less, V: less than 0.01%, and Nb: less than 0.01%, and satisfying Formulae (1) to (3). Its steel micro-structure is made up of ferrite and pearlite, where an area fraction of the pearlite is 85% or more. In the steel, a ratio of a number of composite inclusions to a total number of $Al_2O_3$ inclusions and composite inclusions is 20% or more. The composite inclusions are inclusions that contain, in mass percent, 2.0% or more of $SiO_2$ and 2.0% or more of CaO, and the 99% or more of the balance includes $Al_2O_3$.

$$C+Si/7+Mn/5+Cr/9+Mo/2.5 \leq 1.05 \quad (1)$$

$$C+Si/10+Mn/20+Cr/25 \geq 0.70 \quad (2)$$

$$Cr/Si \leq 0.20 \quad (3)$$

Here, symbols of elements in Formulae (1) to (3) are to be substituted by contents of corresponding elements (mass percent).

Advantageous Effects of Invention

The steel for induction hardening according to the present invention provides an excellent surface fatigue strength after induction hardening.

DESCRIPTION OF EMBODIMENTS

Figure 1:
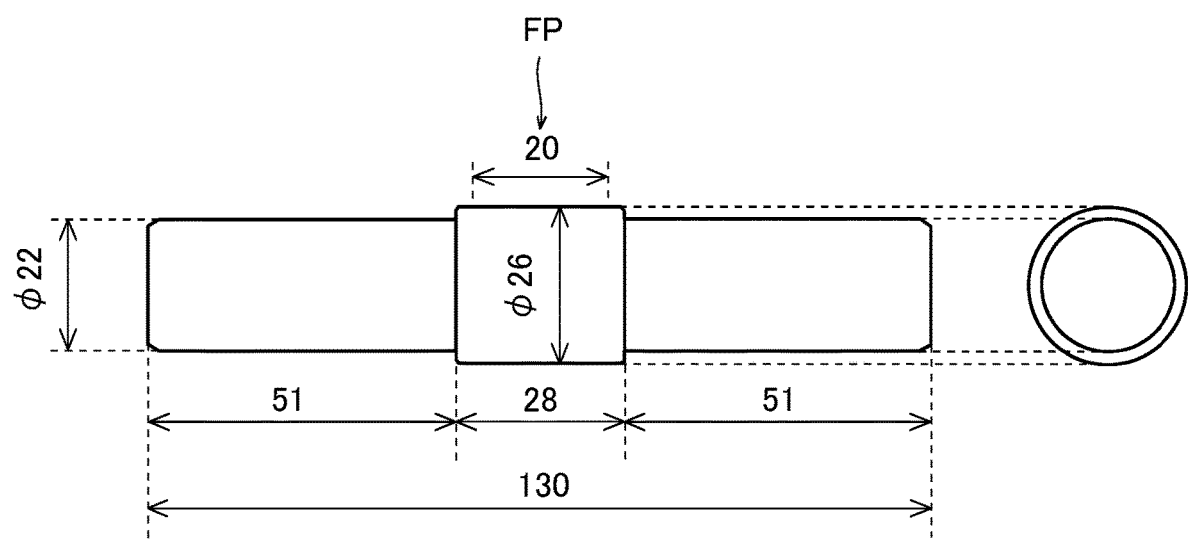
FIG. 1 is a side elevation of a small roller specimen used in a roller-pitting test in Examples.

The present inventors conducted investigation and studies about surface fatigue strength of steel material (machine component) subjected to induction hardening. Consequently, the present inventors obtained the following findings.

(1) To increase a surface fatigue strength of a steel material subjected to induction hardening, it is effective to increase a surface hardness of the steel material subjected to the induction hardening. To increase the surface hardness, it is preferable to perform induction hardening to make a micro-structure in an outer layer of the steel material a uniform hardening structure (martensite). In a case where the micro-structure in the outer layer of the steel material becomes a nonuniform structure, such as a case where ferrite or the like is left in the micro-structure in the outer layer, the surface hardness decreases, and the surface fatigue strength decreases.

To obtain a uniform hardening structure using the induction hardening, it is preferable that a micro-structure of steel for induction hardening is made up of ferrite and pearlite and an area fraction of pearlite is higher in the structure (hereafter, referred to as a fraction of pearlite).

Define Fn1 as Fn1=C+Si/7+Mn/5+Cr/9+Mo/2.5. Fn1 is an index of hardenability. When Fn1 is more than 1.05, the steel indicates an excessively high hardenability. In this case, bainite is produced in the micro-structure of the steel for induction hardening, decreasing the fraction of pearlite. As a result, a nonuniform structure is liable to form in the outer layer even when the induction hardening is performed. As a result, the surface fatigue strength of the steel material is decreased. When Fn1 is 1.05 or less, the micro-structure of the steel for induction hardening is made up of ferrite (pro-eutectoid ferrite) and pearlite, and the fraction of pearlite is 85% or more. "The micro-structure is made up of ferrite and pearlite" means that a total area fraction of ferrite (pro-eutectoid ferrite) and pearlite in the micro-structure is 97% or more.

(2) To obtain a uniform hardening structure using the induction hardening, it is preferable that a micro-structure of steel for induction hardening is a ferrite-pearlite micro structure and the fraction of pearlite is 85% or more as described above.

Define Fn2 as Fn2=C+Si/10+Mn/20+Cr/25. Fn2 is an index of a fraction of pearlite in a case where the micro-structure of steel is a ferrite-pearlite micro structure. The higher Fn2 is, the higher the fraction of pearlite in the micro-structure is. When Fn2 being less than 0.70, the fraction of pearlite in the micro-structure is less than 85%, and a nonuniform structure is liable to be produced in an outer layer of a steel material subjected to induction hardening. As a result, a surface fatigue strength of the steel material decreases. When Fn2 is 0.70 or more, the fraction of pearlite in the micro-structure is 85% or more.

(3) To obtain a uniform hardening structure using the induction hardening, it is further preferable that cementite in the pearlite is easily dissolved during the induction hardening. When undissolved cementite is left in a steel material subjected to the induction hardening, a nonuniform structure forms, resulting in a decrease in surface hardness of the steel material subjected to the induction hardening. As a result, a surface fatigue strength of the steel material decreases.

Si and Cr both reduce pearlite lamellar spacing, making the cementite easily dissolved in the induction hardening. In addition, Si and Cr increase a temper softening resistance of steel. Therefore, Si and Cr both inhibit formation of cementite during tempering, increasing a surface fatigue strength of a steel material. However, Cr concentrates in cementite to stabilize the cementite. Therefore, an excessively high content of Cr makes it difficult to dissolve cementite during high-frequency heating, which makes undissolved cementite easily left in a steel material subjected to the induction hardening. By decreasing a content of Cr with respect to a content of Si, it is possible to inhibit the stabilization of cementite by Cr while at the same time reducing the pearlite lamellar spacing. In this case, cementite is easily dissolved during the high-frequency heating, and the cementite resists being left after the induction hardening.

Define Fn3 as Fn3=Cr/Si. Fn3 is an index indicating how cementite is easily dissolved during the induction hardening. The lower Fn3 is, the more easily cementite in steel is dissolved in the high-frequency heating. In contrast, a high Fn3 indicates that the content of Cr is excessively high with respect to the content of Si. In this case, cementite resists being dissolved during the high-frequency heating. Consequently, a sufficient hardness is not obtained for a steel material subjected to the hardening. When Fn3 is 0.20 or less, cementite is sufficiently dissolved during the induction hardening. As a result, a sufficient surface hardness is obtained in the steel material subjected to the induction hardening, and an excellent surface fatigue strength is obtained.

(4) In addition, a surface fatigue strength of a steel material subjected to the induction hardening is affected by what inclusions in steel are. Steel for machine components produced through the induction hardening (e.g., a toothed gear) is produced by Al deoxidation. Therefore, there are $Al_2O_3$ inclusions in the steel. The $Al_2O_3$ inclusions are liable to agglomerate in a solidification process and liable to form $Al_2O_3$ inclusion groups (clusters), which are coarse. Such clusters cause a decrease in surface fatigue strength of a machine component subjected to the induction hardening. In the present specification, the $Al_2O_3$ inclusions mean inclusions containing $Al_2O_3$ at 99% or more in mass percent.

In addition, the $Al_2O_3$ inclusions have a low adhesiveness on their interfaces with matrices of steel (base metal). Therefore, gaps are likely to develop in interfaces between the $Al_2O_3$ inclusions and the matrices during plastic deformation such as hot forging. Such gaps cause a decrease in surface fatigue strength of the machine component.

Based on the above findings, the present inventors conducted investigations and studies about a method for inhibiting the agglomeration of the inclusions and increasing the adhesiveness on the matrix interfaces. Consequently, the present inventors obtained the following new findings.

In the present specification, inclusions that contain, in mass percent, 2.0% or more of $SiO_2$ and 2.0% or more of CaO with 99% by mass of the balance being $Al_2O_3$, are defined as "composite inclusions". The composite inclusions resist agglomerating and forming clusters. In addition, an adhesiveness of the composite inclusions on the matrix interfaces is higher than that of the $Al_2O_3$ inclusions. Therefore, by increasing a ratio of the composite inclusions to the inclusions in steel, it is possible to increase the surface fatigue strength.

In the present specification, the ratio of the number of composite inclusions to the total number of $Al_2O_3$ inclusions and composite inclusions in steel is defined as a composite-inclusion ratio Ra (%).

The higher the composite-inclusion ratio Ra is, the lower the ratio of the $Al_2O_3$ inclusions in steel is. In this case, it becomes difficult for inclusions to agglomerate, and the formation of clusters is inhibited. In addition, as described above, the adhesiveness of the composite inclusions on the matrix interfaces is high. Hence, when $Al_2O_3$ inclusions are reduced by formation of composite inclusions, a decrease in surface fatigue strength attributable to a decrease in adhesiveness between inclusions and matrices in steel is also inhibited.

When the composite-inclusion ratio Ra is 20% or more, it is possible to inhibit the formation of clusters of $Al_2O_3$ inclusions sufficiently. In addition, the adhesiveness of the matrices in steel on the inclusions is also improved. As a result, it is possible to increase a surface fatigue strength of a steel material subjected to induction hardening.

The steel for induction hardening according to the present embodiment that is made based on the above findings includes a chemical composition consisting of, in mass percent: C: 0.58 to 0.68%, Si: 0.70 to 1.40%, Mn: 0.20 to 1.40%, Al: 0.005 to 0.060%, N: 0.0020 to 0.0080%, Ca: 0.0005 to 0.005%, Cr: 0 to 0.15%, Cu: 0 to 0.50%, Ni: 0 to 0.30%, Mo: 0 to 0.20%, B: 0 to 0.0040%, and Ti: 0 to 0.050%, with the balance being Fe and impurities, the impurities including: P: less than 0.020%, S: less than 0.020%, O: 0.0015% or less, V: less than 0.01%, and Nb: less than 0.01%, and satisfying Formulae (1) to (3). Its steel micro-structure is made up of ferrite and pearlite, where an area fraction of the pearlite is 85% or more. In the steel, a ratio of a number of composite inclusions to a total number of $Al_2O_3$ inclusions and composite inclusions is 20% or more. The composite inclusions are inclusions that contain, in mass percent, 2.0% or more of $SiO_2$ and 2.0% or more of CaO, and the 99% or more of the balance includes $Al_2O_3$.

$$C+Si/7+Mn/5+Cr/9+Mo/2.5 \leq 1.05 \quad (1)$$

$$C+Si/10+Mn/20+Cr/25 \geq 0.70 \quad (2)$$

$$Cr/Si \leq 0.20 \quad (3)$$

Here, symbols of elements in Formulae (1) to (3) are to be substituted by contents of corresponding elements (mass percent).

The above chemical composition may contain one or more types selected from the group consisting of Cr: 0.05 to 0.15%, Cu: 0.03 to 0.50%, Ni: 0.03 to 0.30%, Mo: 0.01 to 0.20%, and B: 0.0003 to 0.0040%.

The above chemical composition may contain Ti: 0.010 to 0.050%.

The steel for induction hardening according to the present embodiment will be described below in detail. The sign "%" following each element means mass percent unless otherwise noted.

[Chemical Composition]

The chemical composition of the steel for induction hardening according to the present embodiment contains the following elements.

C: 0.58 to 0.68%

Carbon (C) increases a surface fatigue strength of steel material subjected to the induction hardening. An excessively low content of C results in failure to provide this effect. In contrast, an excessively high content of C results in decreases in a cold workability of the steel. Consequently, a content of C is 0.58 to 0.68%. A lower limit of the content of C is preferably 0.59%, more preferably 0.60%. An upper limit of the content of C is preferably 0.67%, more preferably 0.66%.

Si: 0.70 to 1.40%

Silicon (Si) deoxidizes steel. In addition, Si increases temper softening resistance and inhibits precipitation of cementite in tempering performed after the induction hardening. Moreover, Si reforms the $Al_2O_3$ inclusions to form composite inclusions ($Al_2O_3$—CaO—$SiO_2$), which resist agglomerating. The formation of the composite inclusions increases the surface fatigue strength of the steel material subjected to the induction hardening. An excessively low content of Si results in failure to provide these effects. In contrast, an excessively high content of Si results in a decrease in cold workability of steel. Consequently, a content of Si is 0.70 to 1.40%. A lower limit of the content of Si is preferably 0.72%, more preferably 0.75%. An upper limit of the content of Si is preferably 1.38%, more preferably 1.36%.

Mn: 0.20 to 1.40%

Manganese (Mn) increases a surface fatigue strength of steel material subjected to the induction hardening. An excessively low content of Mn results in failure to provide this effect. In contrast, an excessively high content of Mn results in a decrease in cold workability of steel. In addition, an excessively high content of Mn causes segregation. As a result, grain boundary strength decreases, and a surface fatigue strength of a steel material decreases. Consequently, a content of Mn is 0.20 to 1.40%. A lower limit of the content of Mn is preferably 0.30%, more preferably 0.35%. An upper limit of the content of Mn is preferably 1.30%, more preferably 1.25%.

Al: 0.005 to 0.060%

Aluminum (Al) deoxidizes steel. In addition, Al combines with N in steel to form AlN, inhibiting grains from coarsening during the induction hardening. An excessively low content of Al results in failure to provide these effects. In contrast, an excessively high content of Al causes formation of a large number of coarse $Al_2O_3$ inclusions and $Al_2O_3$ clusters, aggregates of a plurality of $Al_2O_3$ inclusions, resulting in a decrease in a surface fatigue strength of a steel material subjected to the induction hardening. Consequently, a content of Al is 0.005 to 0.060%. A lower limit of the content of Al is preferably 0.008%, more preferably 0.010%. An upper limit of the content of Al is preferably 0.058%, more preferably 0.056%. The content of Al used herein means a content of Al in total.

N: 0.0020 to 0.0080%

Nitrogen (N) combines with Al to form AlN, inhibiting grains from coarsening during the induction hardening. As a result, N increases a surface fatigue strength of a steel material subjected to the induction hardening. An excessively low content of N results in failure to provide this effect. In contrast, an excessively high content of N causes N to be dissolved in ferrite to excess, bringing about strain aging, which results in a decrease in cold workability of steel. In addition, an excessively high content of N causes formation of coarse nitride, resulting in a decrease in a surface fatigue strength of a steel material. Consequently, a content of N is 0.0020 to 0.0080%. A lower limit of the content of N is preferably 0.0025%, more preferably 0.0030%. An upper limit of the content of N is preferably 0.0075%, more preferably 0.0070%.

Ca: 0.0005 to 0.005%

Calcium (Ca) reforms $Al_2O_3$ inclusions to form composite inclusions ($Al_2O_3$—CaO—$SiO_2$). Reforming the $Al_2O_3$ inclusions to form the composite inclusions increases a surface fatigue strength of a steel material subjected to the induction hardening. An excessively low content of Ca results in failure to provide this effect. In contrast, an excessively high content of Ca causes coarse inclusions to increase, resulting instead in a decrease in the surface fatigue strength of the steel material subjected to the induction hardening. Consequently, a content of Ca is 0.0005 to 0.005%. A lower limit of the content of Ca is preferably 0.0008%, more preferably 0.0010%. An upper limit of the content of Ca is preferably 0.0048%, more preferably 0.0046%.

The balance of the chemical composition of the steel for induction hardening according to the present embodiment is Fe and impurities. Here, the impurities mean elements that are mixed from ores and scraps used as raw material, a producing environment, or the like when the steel for induction hardening is produced in an industrial manner, and are allowed to be mixed within ranges in which the impurities have no adverse effect on the steel for induction hardening according to the present embodiment. In the present embodiment, each content of P, S, O, V, and Nb in the impurities is specified as follows.

P: Less than 0.020%

Phosphorus (P) is an impurity. P segregates in grain boundaries to embrittle them. Therefore, P decreases a surface fatigue strength of a steel material subjected to the induction hardening. Consequently, a content of P is less than 0.020%. An upper limit of the content of P is preferably 0.015%, more preferably 0.012%. The content of P is preferably as low as possible.

S: Less than 0.020%

Sulfur (S) is an impurity. S forms coarse inclusions (MnS), decreasing a surface fatigue strength of a steel material subjected to the induction hardening. Consequently, a content of S is less than 0.020%. An upper limit of the content of S is preferably 0.018%, more preferably 0.016%. The content of S is preferably as low as possible.

O: 0.0015% or Less

Oxygen (O) is an impurity. O combines with Al, Si, and Ca to form their oxides (or their oxide inclusions), resulting in a decrease in a surface fatigue strength of a steel material subjected to the induction hardening. Consequently, a content of O is 0.0015% or less. An upper limit of the content of 0 is preferably 0.0014%, more preferably 0.0013%. The content of 0 is preferably as low as possible.

V: Less than 0.01%

Vanadium (V) is an impurity. V forms V nitride, V carbide, and V carbo-nitride. An excessively high content of V causes formation of coarse V precipitate, resulting in a decrease in cold workability of steel. Consequently, a content of V is less than 0.01%. The content of V is preferably as low as possible.

Nb: Less than 0.01%

Niobium (Nb) is an impurity. Nb forms Nb nitride, Nb carbide, and Nb carbo-nitride. An excessively high content of Nb causes formation of coarse Nb precipitate, resulting in a decrease in cold workability of steel. Consequently, a content of Nb is less than 0.01%. The content of Nb is preferably as low as possible.

The steel for induction hardening according to the present embodiment may further contain one or more types selected from the group consisting of Cr, Cu, Ni, Mo, and B. These elements all increase a surface fatigue strength of a steel material subjected to the induction hardening.

Cr: 0 to 0.15%

Chromium (Cr) is an optional element and need not be contained. When contained, Cr is dissolved in steel, increasing a surface fatigue strength of a steel material subjected to the induction hardening. In addition, Cr increases a temper softening resistance of steel and inhibits formation of cementite during tempering. As a result, a surface fatigue strength of a steel material increases. Even a trace amount of Cr can provide the above effect to some extent. In contrast, Cr is likely to concentrate in cementite to stabilize the cementite. When cementite is stabilized, the cementite resists being dissolved during the induction hardening, and the cementite may be left in some cases. Therefore, dissolved C is not obtained sufficiently, and a sufficient hardness of a steel material is not obtained. As a result, a surface fatigue strength of the steel material decreases. Consequently, a content of Cr is 0 to 0.15%. To obtain the above effect more effectively, a lower limit of the content of Cr is preferably 0.01%, more preferably 0.05%, still more preferably 0.06%, still more preferably 0.07%. An upper limit of the content of Cr is preferably 0.14%, more preferably 0.13%.

Cu: 0 to 0.50%

Copper (Cu) is an optional element and need not be contained. When contained, Cu is dissolved in steel, increasing a surface fatigue strength of a steel material subjected to the induction hardening. Even a trace amount of Cu can provide this effect to some extent. In contrast, an excessively high content of Cu makes the above effect saturated. Consequently, a content of Cu is 0 to 0.50%. In order to obtain the above effect more effectively, a lower limit of the content of Cu is preferably 0.03%, more preferably 0.04%. An upper limit of the content of Cu is preferably 0.45%, more preferably 0.40%.

Ni: 0 to 0.30%

Nickel (Ni) is an optional element and need not be contained. When contained, Ni is dissolved in steel, increasing a surface fatigue strength of a steel material subjected to the induction hardening. Even a trace amount of Ni can provide the above effect to some extent. In contrast, an excessively high content of Ni makes the above effect saturated. Consequently, a content of Ni is 0 to 0.30%. In order to obtain the above effect more effectively, a lower limit of the content of Ni is preferably 0.03%, more preferably 0.04%. An upper limit of the content of Ni is preferably 0.25%, more preferably 0.20%.

Mo: 0 to 0.20%

Molybdenum (Mo) is an optional element and need not be contained. When contained, Mo is dissolved in steel, increasing a surface fatigue strength of a steel material subjected to the induction hardening. Even a trace amount of Mo can provide the above effect to some extent. In contrast, an excessively high content of Mo makes a ratio of pearlite in a steel material for induction hardening less than 85%, resulting in a decrease in cold workability. Consequently, a content of Mo is 0 to 0.20%. In order to obtain the above effect more effectively, a lower limit of the content of Mo is preferably 0.01%, more preferably 0.02%. An upper limit of the content of Mo is preferably 0.18%, more preferably 0.16%.

B: 0 to 0.0040%

Boron (B) is an optional element and need not be contained. When contained, B is dissolved in steel, increasing a hardenability of steel. As a result, B increases a surface fatigue strength of a steel material subjected to the induction hardening. Even a trace amount of B can provide the above effect to some extent. In contrast, an excessively high content of B makes the above effects saturated. Consequently, a content of B is 0 to 0.0040%. In order to obtain the above effect more effectively, a lower limit of the content of B is preferably 0.0003%, more preferably 0.0005%. An upper limit of the content of B is preferably 0.0038%, more preferably 0.0036%.

The steel for induction hardening according to the present embodiment may further contain Ti, in lieu of part of Fe.

Ti: 0 to 0.050%

Titanium (Ti) is an optional element and need not be contained. When contained, Ti forms Ti nitride or Ti carbide, inhibiting grains from coarsening during the induction hardening. As a result, a surface fatigue strength of a steel material subjected to the induction hardening is increased. In addition, Ti combines with N, thereby inhibiting B from combining with N to secure an amount of dissolved B. Even a trace amount of Ti can provide the above effect to some extent. In contrast, an excessively high content of Ti causes formation of coarse Ti nitride and Ti carbide, resulting in a decrease in cold workability of steel. Consequently, a content of Ti is 0 to 0.050%. In order to obtain the above effect more effectively, a lower limit of the content of Ti is 0.010%, more preferably 0.012%. An upper limit of the content of Ti is preferably 0.048%, more preferably 0.046%.

[Formula (1)] The above chemical composition further satisfies Formula (1):

$$C+Si/7+Mn/5+Cr/9+Mo/2.5 \leq 1.05 \quad (1)$$

where, symbols of elements in Formula (1) are to be substituted by contents of the corresponding elements (in mass percent).

Define Fn1 as Fn1=C+Si/7+Mn/5+Cr/9+Mo/2.5. Fn1 is an index of hardenability. Fn1 being more than 1.05 indicates an excessively high hardenability. In this case, hard bainite is produced in part of a micro-structure of rolled steel for induction hardening. Therefore, a ferrite-pearlite micro structure is not obtained. When Fn1 is 1.05 or less, a micro-structure of steel for induction hardening is a ferrite-pearlite microstructure. Consequently, Fn1 is set at 1.05 or less. An upper limit of Fn1 is preferably 1.04. In order to obtain a hardenability, a lower limit of Fn1 is preferably 0.72.

[Formula (2)]
The above chemical composition further satisfies Formula (2):

$$C+Si/10+Mn/20+Cr/25 \geq 0.70 \quad (2)$$

where, symbols of elements in Formula (2) are to be substituted by contents of corresponding elements (in mass percent).

Define Fn2 as Fn2=C+Si/10+Mn/20+Cr/25. Fn2 is an index of a fraction of pearlite in a case where the micro-structure of steel is a ferrite-pearlite microstructure. The higher Fn2 is, the higher the fraction of pearlite in the micro-structure is. When Fn2 is less than 0.70, the fraction of pearlite in the micro-structure is less than 85%. When Fn2 is 0.70 or more, the fraction of pearlite in the micro-structure is 85% or more. A lower limit of Fn2 is preferably 0.72.

[Formula (3)]
The above chemical composition further satisfies Formula (3):

$$Cr/Si \leq 0.20 \quad (3)$$

where, symbols of elements in Formula (3) are to be substituted by contents of corresponding elements (mass percent).

As described above, Si and Cr both reduce pearlite lamellar spacing. When the pearlite lamellar spacing is reduced, cementite is easily dissolved during the induction hardening. However, Cr concentrates in cementite to stabilize the cementite. By increasing a content of Si with respect to a content of Cr, it is possible to inhibit the stabilization of cementite by Cr while at the same time reducing the pearlite lamellar spacing. Therefore, cementite is easily dissolved during the induction hardening, and the cementite resists being left after the induction hardening.

Define Fn3 as Fn3=Cr/Si. Fn3 is an index indicating to what degree cementite is dissolved after the induction hardening. The lower Fn3 is, the more easily cementite in steel is dissolved in the high-frequency heating. In contrast, a high Fn3 indicates that the content of Cr is excessively high with respect to the content of Si. In this case, cementite resists being dissolved during the high-frequency heating. As a result, cementite is left in a steel material subjected to the hardening, resulting in a decrease in a surface fatigue strength of the steel material subjected to the induction hardening. When Fn3 is 0.20 or less, cementite is sufficiently dissolved after the induction hardening. As a result, a sufficient hardness is obtained in the steel material subjected to the induction hardening, and an excellent surface fatigue strength is obtained. A lower limit of Fn3 is preferably 0.18.

[Micro-Structure of Steel]
When steel for induction hardening includes the above chemical composition and satisfies Formulae (1) to (3), its micro-structure is made up of ferrite (pro-eutectoid ferrite) and pearlite. That is, the micro-structure of the steel for induction hardening according to the present embodiment is a ferrite-pearlite microstructure. "The micro-structure is made up of ferrite and pearlite" herein means that a total area fraction of the ferrite and the pearlite in the micro-structure is 97% or more. In the micro-structure of the steel for induction hardening, it is preferable that the total area fraction of the ferrite and the pearlite is 100%. When the total area fraction of the ferrite and the pearlite is not 100%, the balance of the micro-structure, other than the ferrite and the pearlite, is bainite, for example. The area fraction of the pearlite in the micro-structure is defined as a fraction of pearlite (%). In the micro-structure of the steel for induction hardening according to the present embodiment, the fraction of pearlite is 85% or more.

The total area fraction of the ferrite and the pearlite in the micro-structure and the fraction of pearlite are measured by the following method. A sample is taken from the steel for induction hardening. When the steel for induction hardening is a steel bar or a wire rod, the sample is taken from a cross-sectional area of the steel bar or the wire rod (a surface perpendicular to its axis direction) of half a radius R connecting a surface and a center axis of the steel bar or the wire rod (hereafter referred to as an R/2 portion). Of surfaces of the taken sample, one perpendicular to a rolling direction of the steel material is determined as an observation surface. The observation surface is polished and thereafter etched with 3% nitric acid and alcohol (Nital etching reagent). The etched observed surface is observed under an optical microscope with 500× magnification, and photographic images of any five visual fields on the etched observed surface are created. A size of each visual field is set at 200 μm×200 μm.

In each of the visual fields, phases including ferrite, pearlite, and the like have their own different contrasts. Therefore, the phases are identified based on their respective contrasts. Of the identified phases, a total area of ferrite (μm$^2$) and a total area of pearlite (μm$^2$) are determined in each visual field. A ratio of a sum of a total area of ferrite and a total area of pearlite in all the visual fields to a total area of all the visual fields is defined as a total area fraction of ferrite and pearlite (%). In addition, the total area of pearlite in all the visual field to the total area of all the visual fields is defined as a fraction of pearlite (%).

[Composite-Inclusions Ratio Ra]
The steel for induction hardening according to the present embodiment contains $Al_2O_3$ inclusions and composite inclusions. In the present specification, as described above, inclusions that contain 2.0% or more of $SiO_2$ and 2.0% or more of CaO with 99% or more of the balance being $Al_2O_3$ are defined as "composite inclusions". An upper limit of $SiO_2$ contained in the composite inclusions is, for example, 15%, and an upper limit of CaO contained in the composite inclusions is, for example, 25%.

In the present specification, the ratio of the number of composite inclusions to the total number of $Al_2O_3$ inclusions and composite inclusions is defined as the composite-inclusion ratio Ra (%). The higher the composite-inclusion ratio Ra is, the less the $Al_2O_3$ inclusions in steel are. In this case, it becomes difficult for $Al_2O_3$ inclusions agglomerate, and the formation of clusters is inhibited. In addition, as described above, the adhesiveness of the $Al_2O_3$ inclusions on the matrix interfaces is low, whereas the adhesiveness of the composite inclusions on the matrix interfaces is high. Hence, when a number of $Al_2O_3$ inclusions is reduced by formation of composite inclusions, a decrease in surface fatigue strength attributable to a decrease in adhesiveness between inclusions and matrices in steel is also inhibited.

When the composite-inclusion ratio Ra is 20% or more, it is possible to inhibit the formation of clusters of $Al_2O_3$ inclusions sufficiently. In addition, the adhesiveness of the matrices in steel on the inclusions is also improved. As a result, it is possible to increase a surface fatigue strength of a steel material subjected to induction hardening.

Identification of $Al_2O_3$ inclusions and composite inclusions in steel and measurement of the composite-inclusion ratio Ra can be performed by the following method. A sample is taken from a desired location in the steel for induction hardening. When the steel for induction hardening is a steel bar or a wire rod, the sample is taken from an R/2 portion of the steel bar or the wire rod. On a cross section (surface) of the R/2 portion in the sample, randomly selected 20 visual fields (with an evaluation area per visual field is 100 μm×100 μm) are observed at 1000× magnification under a scanning electron microscope (SEM).

In each visual field (referred to as an observation surface), inclusions are identified. For each of the identified inclusions, $Al_2O_3$ inclusions and composite inclusions are identified using the Energy Dispersive X-ray Spectroscopy (EDX). Specifically, when elemental analysis of the identified inclusions shows that when a content of Al and a content of O are 99% or more in mass percent, the inclusions are defined as $Al_2O_3$ inclusions. When the elemental analysis shows that the identified inclusions contain 2.0% or more of $SiO_2$ and 2.0% or more of CaO, with the balance being substantially $Al_2O_3$ and impurities (specifically, 99% or more of the balance is $Al_2O_3$), the inclusions are defined as "composite inclusions".

The inclusions to be identified are assumed to be inclusions having a circle equivalent diameter of 10 μm or more. Here, the circle equivalent diameter means a diameter of a circle into which an inclusion is converted and that has the same area as the inclusion.

Inclusions each having a circle equivalent diameter twice or larger a beam diameter of the EDX allows an accuracy of the elementary analysis to be increased. In the present embodiment, a beam diameter of the EDX used to identify the inclusions is assumed to be 5 μm. In this case, inclusions each having a circle equivalent diameter of less than 10 μm cannot increase an accuracy of the elementary analysis by the EDX. In addition, the inclusions each having a circle equivalent diameter of less than 10 μm have a very minor adverse on the fatigue strength. Therefore, in the present embodiment, $Al_2O_3$ inclusions and composite inclusions each having a circle equivalent diameter of 10 μm or more are assumed to be measured. The upper limit of the circle equivalent diameters of the $Al_2O_3$ inclusions and composite inclusions is not limited to particular one but, for example, 200 μm.

A total number TN1 of identified $Al_2O_3$ inclusions each having a circle equivalent diameter of 10 μm or more in all of 20 visual fields is determined. Similarly, a total number TN2 of identified composite inclusions each having a circle equivalent diameter of 10 μm or more is determined. Based on the determined total numbers, the composite-inclusion ratio Ra (%) is determined by the following Formula:

$$Ra=TN2/(TN1+TN2)\times100$$

When inclusions having the same composition are adjacent to each other, and a shortest distance between the adjacent inclusions is less than 1 μm, these inclusions are regarded as one inclusion.

[Producing Method]

Description will be made about an example of a producing method of the steel for induction hardening according to the present embodiment. In the present embodiment, as an example of the steel for induction hardening, a method for producing a steel bar and a wire rod will be described. However, the steel for induction hardening according to the present embodiment is not limited to the steel bar or the wire rod.

The example of the producing method includes a steelmaking step of refining molten steel and casting the molten steel to produce a starting material (cast piece or ingot), and a hot working step of performing hot working on the starting material to produce the steel for induction hardening. Each of the steps will be described below.

[Steelmaking Step]

The steelmaking step includes a refining step and a casting step.

[Refining Step]

In the refining step, molten iron produced by a well-known method is first subjected to refining in a converter (first refining). Molten steel tapped from the converter is subjected to second refining. In the second refining, alloying elements for adjustment of components is added to produce molten steel satisfying the above chemical composition.

Specifically, Al is added to the molten steel tapped from the converter to perform deoxidation treatment. After the deoxidation treatment, slag-off treatment is performed. After the slag-off treatment, the second refining is performed. In the second refining, for example, composite refining is performed. For example, a refining treatment including LF (Ladle Furnace) or VAD (Vacuum Arc Degassing) is first performed. In addition, RH (Ruhrstahl-Hausen) vacuum degassing treatment is performed. Thereafter, final adjustment of alloy elements other than Si and Ca is performed.

After performing the second refining to perform adjustment of components of the molten steel other than Si and Ca, the molten steel is subjected to the next treatment (a heating retaining step and a final component adjusting step).

[Heating Retaining Step]

The molten steel in a ladle after the second refining (final component adjustment) is heated at a temperature of 1500 to 1600° C. for a retention time is twice or longer than a mixing time τ(s), which is calculated by the following Formulae:

$$\tau=800\times\varepsilon^{-0.4}$$

$$\varepsilon=((6.18\times V_g\times T_1/M_1)\ln(1+(h_0/(1.46\times10^{-5}\times P_0))))$$

where, Vg: gas flow rate ($Nm^3$/min), $M_1$: mass of the molten steel in the ladle (ton), temperature of the molten steel (K), $h_0$: gas injection depth (m), $P_0$: surface pressure of the molten steel (Pa), ε: agitation power density (W/ton), and τ: mixing time (s).

When the retention time ts is less than twice the mixing time τ, $Al_2O_3$ inclusions are not reformed into composite inclusions sufficiently. That is, the composite-inclusion ratio Ra becomes as low as less than 20%. When the retention time ts is twice or longer than the mixing time τ, the composite-inclusion ratio Ra becomes 20% or more on an assumption that other conditions are met.

[Final Component Adjusting Step]

Si and Ca are added to the molten steel subjected to the heating retaining step to produce the molten steel satisfying the chemical composition and Formulae (1) to (3) described above. Si and Ca may be each added to the molten steel as a separate raw material. Si—Ca alloy may be added to the molten steel.

The addition of Si and Ca to the molten steel that has been sufficiently, uniformly heated in the heating retaining step allows the $Al_2O_3$ inclusions to be reformed into the composite inclusions easily. By performing the final component adjusting step after the above heating retaining step, it is possible to make the composite-inclusion ratio Ra in the steel for induction hardening 20% or more.

If Si is added to the molten steel prior to the addition of Al, the composite inclusions resist forming. By adding Si and Ca to the molten steel in which $Al_2O_3$ inclusions are present, composite inclusions are formed by the $Al_2O_3$ inclusions reformed into the composite inclusions. Therefore, in the present embodiment, Al is added to the molten steel before Si and Ca are added. An order of the adding of Si and Ca is not limited to particular one. Si and Ca may be added at the same time. One of Si and Ca may be added prior to the other.

[Casting Step]

Using the molten steel produced by the above refining step, the starting material (cast piece or ingot) is produced. Specifically, the continuous casting process is performed using the molten steel to produce a cast piece. Alternatively, the ingot-making process may be performed using the molten steel to produce an ingot.

[Hot Working Step]

The produced starting material is subjected to hot working to be produced into a steel material for induction hardening (steel bar or wire rod). In the hot working process, the hot working is performed normally one or a plurality of times. When the hot working is performed a plurality of times, the hot working of the first time is, for example, blooming or hot forging, and the hot working of the next time is finish rolling using a continuous mill. In the continuous mill, horizontal stands and vertical stands are arranged alternately in a row, the horizontal stands each including a pair of horizontal rolls, the vertical stands each including a pair of vertical rolls. The steel material for induction hardening subjected to the finish rolling is cooled to room temperature. At that time, an average cooling rate of a surface temperature of the steel material for induction hardening until the surface temperature reaches 800 to 500° C. is set at 1° C./sec or less. If the average cooling rate is more than 1° C./sec, bainite is produced at 3% or more in terms of area fraction in a micro-structure of the cooled steel material for induction hardening. When the average cooling rate is 1° C./sec or less, the micro-structure of the cooled steel material for induction hardening is made up of ferrite and pearlite. A lower limit of the average cooling rate is preferably 0.1° C./sec. An upper limit of the average cooling rate is preferably 0.7° C./sec.

Through the steps described above, the steel for induction hardening according to the present embodiment can be produced.

[Method for Producing Machine Component]

The steel for induction hardening described above is produced into a machine component as represented by a toothed gear. An example of a method for producing the machine component is as follows.

First, hot forging is performed on a prepared steel material for induction hardening to produce an intermediate product. As necessary, stress relief annealing is performed on the intermediate product. The intermediate product subjected to the hot forging or the stress relief annealing is subjected to cutting working to be produced into a crude product. In a case where the machine component is a toothed gear, the crude product has a rough shape of the toothed gear. The crude product is subjected to induction hardening. After the induction hardening, grinding machining is performed to produce the machine component as represented by a toothed gear.

The steel for induction hardening according to the present embodiment satisfies the above Formulae (1) to (3) and further makes the composite-inclusion ratio Ra 20% or more. Therefore, it is possible to increase a surface fatigue strength of a machine component subjected to the induction hardening.

EXAMPLES

Molten steels having chemical compositions shown in Table 1 were produced.

TABLE 1

| Test number | Chemical composition (mass %, balance being Fe and impurities) | | | | | | | | | | | |
|---|---|---|---|---|---|---|---|---|---|---|---|---|
| | C | Si | Mn | P | S | Al | N | O | Ca | Cr | Cu | Ni |
| 1 | 0.60 | 1.12 | 0.84 | 0.009 | 0.011 | 0.047 | 0.0064 | 0.0011 | 0.0011 | — | — | — |
| 2 | 0.67 | 0.80 | 0.32 | 0.011 | 0.012 | 0.018 | 0.0045 | 0.0012 | 0.0021 | 0.09 | — | — |
| 3 | 0.59 | 0.95 | 0.55 | 0.009 | 0.010 | 0.023 | 0.0056 | 0.0011 | 0.0033 | 0.13 | — | — |
| 4 | 0.65 | 1.39 | 0.71 | 0.008 | 0.015 | 0.046 | 0.0048 | 0.0013 | 0.0041 | 0.14 | — | — |
| 5 | 0.62 | 0.71 | 0.36 | 0.009 | 0.013 | 0.026 | 0.0042 | 0.0011 | 0.0035 | 0.14 | — | — |
| 6 | 0.60 | 0.85 | 0.80 | 0.007 | 0.008 | 0.022 | 0.0028 | 0.0009 | 0.0018 | 0.12 | — | — |
| 7 | 0.61 | 1.15 | 0.21 | 0.008 | 0.008 | 0.052 | 0.0061 | 0.0013 | 0.0025 | 0.11 | — | — |
| 8 | 0.62 | 1.21 | 0.32 | 0.009 | 0.011 | 0.029 | 0.0044 | 0.0012 | 0.0036 | 0.14 | — | — |
| 9 | 0.59 | 1.33 | 0.64 | 0.011 | 0.012 | 0.050 | 0.0059 | 0.0011 | 0.0041 | 0.06 | — | — |
| 10 | 0.62 | 0.85 | 0.92 | 0.015 | 0.012 | 0.059 | 0.0050 | 0.0008 | 0.0037 | 0.11 | — | — |
| 11 | 0.64 | 1.18 | 0.85 | 0.008 | 0.013 | 0.006 | 0.0055 | 0.0011 | 0.0029 | 0.13 | — | — |
| 12 | 0.59 | 1.27 | 0.33 | 0.010 | 0.012 | 0.009 | 0.0075 | 0.0012 | 0.0048 | 0.11 | — | — |
| 13 | 0.63 | 1.05 | 0.38 | 0.007 | 0.015 | 0.016 | 0.0064 | 0.0012 | 0.0006 | 0.14 | — | — |
| 14 | 0.62 | 1.10 | 1.26 | 0.008 | 0.010 | 0.022 | 0.0043 | 0.0014 | 0.0033 | 0.12 | 0.12 | — |
| 15 | 0.64 | 1.22 | 0.30 | 0.006 | 0.013 | 0.053 | 0.0071 | 0.0011 | 0.0044 | 0.13 | — | 0.22 |
| 16 | 0.64 | 1.15 | 0.81 | 0.009 | 0.009 | 0.039 | 0.0057 | 0.0010 | 0.0015 | 0.08 | — | — |
| 17 | 0.61 | 0.88 | 0.31 | 0.012 | 0.011 | 0.030 | 0.0044 | 0.0009 | 0.0019 | 0.14 | — | — |
| 18 | 0.62 | 0.92 | 0.32 | 0.008 | 0.011 | 0.041 | 0.0062 | 0.0013 | 0.0048 | 0.11 | — | — |
| 19 | 0.63 | 0.72 | 1.39 | 0.006 | 0.012 | 0.029 | 0.0049 | 0.0011 | 0.0010 | 0.14 | 0.16 | 0.20 |
| 20 | 0.62 | 0.28 | 1.19 | 0.010 | 0.015 | 0.081 | 0.0041 | 0.0012 | — | 0.79 | — | — |
| 21 | 0.63 | 0.52 | 0.31 | 0.012 | 0.011 | 0.039 | 0.0045 | 0.0013 | 0.0022 | 0.10 | — | — |

TABLE 1-continued

| | | | | | | | | | | | |
|---|---|---|---|---|---|---|---|---|---|---|---|
| 22 | 0.61 | 0.81 | 1.58 | 0.010 | 0.012 | 0.042 | 0.0055 | 0.0008 | 0.0021 | 0.08 | — — |
| 23 | 0.62 | 0.72 | 0.12 | 0.008 | 0.009 | 0.022 | 0.0038 | 0.0014 | 0.0024 | 0.14 | — — |
| 24 | 0.64 | 1.22 | 0.65 | 0.011 | 0.015 | 0.033 | 0.0056 | 0.0011 | 0.0031 | 0.24 | — — |
| 25 | 0.59 | 1.18 | 0.64 | 0.012 | 0.018 | 0.069 | 0.0045 | 0.0014 | 0.0019 | 0.11 | — — |
| 26 | 0.63 | 0.86 | 0.33 | 0.010 | 0.014 | 0.001 | 0.0065 | 0.0010 | 0.0023 | 0.11 | — — |
| 27 | 0.59 | 1.35 | 0.37 | 0.012 | 0.015 | 0.031 | 0.0045 | 0.0011 | 0.0062 | 0.12 | — — |
| 28 | 0.65 | 0.85 | 0.78 | 0.016 | 0.014 | 0.022 | 0.0063 | 0.0013 | 0.0002 | 0.10 | — — |
| 29 | 0.67 | 1.37 | 1.25 | 0.010 | 0.015 | 0.040 | 0.0041 | 0.0012 | 0.0031 | 0.12 | — — |
| 30 | 0.68 | 1.40 | 0.98 | 0.008 | 0.009 | 0.051 | 0.0045 | 0.0011 | 0.0026 | 0.15 | — — |
| 31 | 0.59 | 0.72 | 0.23 | 0.007 | 0.014 | 0.039 | 0.0045 | 0.0009 | 0.0022 | 0.10 | — — |
| 32 | 0.61 | 0.71 | 0.21 | 0.009 | 0.016 | 0.024 | 0.0033 | 0.0011 | 0.0031 | 0.06 | — — |
| 33 | 0.64 | 0.71 | 0.75 | 0.007 | 0.012 | 0.041 | 0.0045 | 0.0013 | 0.0029 | 0.15 | — — |
| 34 | 0.67 | 0.70 | 0.21 | 0.016 | 0.014 | 0.055 | 0.0060 | 0.0012 | 0.0033 | 0.15 | — — |
| 35 | 0.66 | 0.85 | 0.81 | 0.011 | 0.012 | 0.018 | 0.0045 | 0.0011 | 0.0021 | 0.11 | — — |
| 36 | 0.60 | 1.16 | 0.67 | 0.009 | 0.012 | 0.023 | 0.0056 | 0.0011 | 0.0033 | 0.13 | — — |
| 37 | 0.63 | 0.98 | 0.28 | 0.011 | 0.009 | 0.046 | 0.0045 | 0.0013 | 0.0034 | 0.13 | — — |
| 38 | 0.64 | 1.18 | 0.85 | 0.008 | 0.013 | 0.006 | 0.0055 | 0.0011 | 0.0029 | 0.13 | — — |

| Test number | Chemical composition (mass %, balance being Fe and impurities) | | | | | Fn1 | Fn2 | Fn3 | ts/τ | Order of addition | Cooling rate |
|---|---|---|---|---|---|---|---|---|---|---|---|
| | Mo | B | Ti | V | Nb | | | | | | |
| 1 | — | — | — | — | — | 0.93 | 0.75 | 0 | 3.0 | 1 | S |
| 2 | — | — | — | — | — | 0.86 | 0.77 | 0.11 | 3.0 | 1 | S |
| 3 | — | — | — | — | — | 0.85 | 0.72 | 0.14 | 3.0 | 1 | S |
| 4 | — | — | — | — | — | 1.01 | 0.83 | 0.10 | 4.0 | 1 | S |
| 5 | — | — | — | — | — | 0.81 | 0.71 | 0.20 | 3.0 | 1 | S |
| 6 | — | — | — | — | — | 0.89 | 0.73 | 0.14 | 5.0 | 1 | S |
| 7 | — | — | — | — | — | 0.83 | 0.74 | 0.10 | 3.0 | 1 | S |
| 8 | — | — | — | — | — | 0.87 | 0.76 | 0.12 | 2.0 | 1 | S |
| 9 | — | — | — | — | — | 0.91 | 0.76 | 0.05 | 2.5 | 1 | S |
| 10 | — | — | — | — | — | 0.94 | 0.76 | 0.13 | 3.0 | 1 | S |
| 11 | — | — | — | — | — | 0.99 | 0.81 | 0.11 | 4.0 | 1 | S |
| 12 | — | — | — | — | — | 0.85 | 0.74 | 0.09 | 3.0 | 1 | S |
| 13 | — | — | — | — | — | 0.87 | 0.76 | 0.13 | 3.0 | 1 | S |
| 14 | — | — | — | — | — | 1.04 | 0.80 | 0.11 | 4.0 | 1 | S |
| 15 | — | — | — | — | — | 0.89 | 0.78 | 0.11 | 3.0 | 1 | S |
| 16 | 0.15 | — | — | — | — | 1.04 | 0.80 | 0.07 | 4.0 | 1 | S |
| 17 | — | — | 0.031 | — | — | 0.81 | 0.72 | 0.16 | 5.0 | 1 | S |
| 18 | — | 0.0032 | 0.028 | — | — | 0.83 | 0.73 | 0.12 | 3.0 | 1 | S |
| 19 | — | — | — | — | — | 1.03 | 0.78 | 0.19 | 2.5 | 1 | S |
| 20 | — | — | — | — | — | 0.99 | 0.74 | 2.82 | 1.0 | 1 | S |
| 21 | — | — | — | — | — | 0.78 | 0.70 | 0.19 | 3.0 | 1 | S |
| 22 | — | — | — | — | — | 1.05 | 0.77 | 0.10 | 3.0 | 1 | S |
| 23 | — | — | — | — | — | 0.76 | 0.70 | 0.19 | 3.0 | 1 | S |
| 24 | — | — | — | — | — | 0.97 | 0.80 | 0.20 | 2.0 | 1 | S |
| 25 | — | — | — | — | — | 0.90 | 0.74 | 0.09 | 3.0 | 1 | S |
| 26 | — | — | — | — | — | 0.83 | 0.74 | 0.13 | 2.0 | 1 | S |
| 27 | — | — | — | — | — | 0.87 | 0.75 | 0.09 | 3.0 | 1 | S |
| 28 | — | — | — | — | — | 0.94 | 0.78 | 0.12 | 4.0 | 1 | S |
| 29 | — | — | — | — | — | 1.13 | 0.87 | 0.09 | 3.0 | 1 | S |
| 30 | — | — | — | — | — | 1.09 | 0.88 | 0.11 | 3.0 | 1 | S |
| 31 | — | — | — | — | — | 0.75 | 0.68 | 0.14 | 3.0 | 1 | S |
| 32 | — | — | — | — | — | 0.76 | 0.69 | 0.08 | 2.0 | 1 | S |
| 33 | — | — | — | — | — | 0.91 | 0.75 | 0.21 | 3.0 | 1 | S |
| 34 | — | — | — | — | — | 0.83 | 0.76 | 0.21 | 3.0 | 1 | S |
| 35 | — | — | — | — | — | 0.96 | 0.79 | 0.13 | 1.0 | 1 | S |
| 36 | — | — | — | — | — | 0.91 | 0.75 | 0.11 | 1.5 | 1 | S |
| 37 | — | — | — | — | — | 0.84 | 0.75 | 0.13 | 3.0 | 2 | S |
| 38 | — | — | — | — | — | 0.99 | 0.81 | 0.11 | 4.0 | 1 | F |

* An order of addition "1" means that Al was added before Si and Ca were added. An order of addition "2" means that Si was added before Al and Ca were added.

Each of signs "-" in Table 1 means that a content of a corresponding element is at an impurity level. Specifically, a sign "-" seen in a content of Ca means that the content of Ca is less than 0.0001%. Signs "-" seen in contents of Cr, Cu, Ni, and Mo, respectively, mean that the contents of the corresponding elements are less than 0.01%. Signs "-" seen in contents of B mean that the contents of B are less than 0.0001%. Signs "-" seen in contents of Ti mean that the contents of Ti are less than 0.001%. Signs "-" seen in contents of V, and Nb, respectively, mean that the contents of V, and Nb are less than 0.01%.

In "Fn1" columns of Table 1, values of Fn1 of steels of corresponding test numbers are written. In "Fn2" columns, values of Fn2 of steels of corresponding test numbers are written. In "Fn3" columns, values of Fn3 of steels of corresponding test numbers are written.

The molten steel of the corresponding test numbers were produced by the following method. Molten irons produced by a well-known method were subjected to the first refining in a converter in the same conditions.

The molten steels other than that of a test number 37 were tapped from the converter, then subjected to the deoxidation treatment by adding Al, and thereafter subjected to the slag-off treatment. The slag-off treatment was followed by the refining treatment using VAD and then the RH vacuum degassing treatment. Through the above steps, composition components of the alloying element other than Si and Ca were adjusted.

Subsequently, the heating retaining step was performed. Ratios (ts/τ) of retention times is of corresponding test numbers to the mixing time τ were those shown in Table 1. After the heat retention process, Si—Ca alloy was added to the molten steels other than that of the test number 37 to adjust their contents of Si and their content of Ca, and the molten steels having the chemical compositions shown in Table 1 were produced.

In contrast, for molten steel of the test number 37, deoxidation treatment by adding Si was performed after tapping of the molten steel from the converter. The subsequent processes performed on the molten steel up to the heating retaining step were the same as those performed on the molten steel of the test numbers 1 to 36 and 38. After the heating retaining step, Al and Ca were added, and the molten steel having its chemical composition shown in Table 1 was produced.

The molten steel of the test numbers 1 to 38 were used to produce cast pieces by the continuous casting process, the cast pieces each having a cross section of 400 mm×300 mm.

The produced cast pieces were heated to 1250° C. The heated cast pieces were used to be produced into billets by the blooming, the billets each having a cross section of 162 mm×162 mm. The produced billets were subjected to air cooling to a normal temperature (25° C.). The billets were heated again to 1200° C. The heated billets were subjected to the hot rolling using a continuous mill (the finish rolling) and then cooled to be produced into steel bars for induction hardening each having a diameter of 70 mm.

For each of the test numbers, an average cooling rate of a surface temperature of the corresponding steel bar subjected to the finish rolling until the surface temperature reached 800 to 500° C. is shown in Table 1. In a "cooling rate" column of Table 1, "S" (Slow) means that an average cooling rate of a surface temperature of a steel bar subjected to finish rolling corresponding to a test number until the surface temperature reached to 800 to 500° C. was 1° C./sec or less. In a "cooling rate" column of Table 1, "F" (Fast) means that an average cooling rate of a surface temperature of a steel bar subjected to finish rolling corresponding to a test number until the surface temperature reached to 800 to 500° C. was more than 1° C./sec. For each test number, a chemical composition of a produced steel bar corresponding thereto was measured. As a result, the chemical composition of the steel bar corresponding to each test number was as shown in Table 1.

[Micro-Structure Observation]

From an R/2 portion of a steel bar of each test number, a test specimen for micro-structure observation was taken. Of the surfaces of the test specimen, a cross section extending in parallel to a longitudinal direction of the steel bar (i.e., its rolling direction or its elongating direction) was defined as an observation surface. Based on the method described above, a total area fraction of ferrite and pearlite (%) was determined. A micro-structure having a total area fraction of 97% or more is shown as "F+P" in Table 2. In contrast, a micro-structure having a total area fraction of less than 97% and observed that bainite is present in the balance is shown as "F+P+B" in Table 2.

TABLE 2

| Test number | Micro-structure | Fraction of pearlite (%) | Ra (%) | Vickers hardness (HV) | Surface fatigue strength (%) |
|---|---|---|---|---|---|
| 1 | F + P | 89 | 25 | 755 | 115 |
| 2 | F + P | 95 | 25 | 770 | 125 |
| 3 | F + P | 90 | 30 | 750 | 120 |
| 4 | F + P | 93 | 30 | 770 | 135 |
| 5 | F + P | 91 | 25 | 760 | 120 |
| 6 | F + P | 90 | 35 | 755 | 125 |
| 7 | F + P | 90 | 30 | 760 | 130 |
| 8 | F + P | 93 | 30 | 760 | 130 |
| 9 | F + P | 88 | 30 | 750 | 135 |
| 10 | F + P | 91 | 35 | 760 | 120 |
| 11 | F + P | 94 | 35 | 770 | 125 |
| 12 | F + P | 89 | 30 | 750 | 130 |
| 13 | F + P | 91 | 25 | 770 | 125 |
| 14 | F + P | 90 | 30 | 765 | 125 |
| 15 | F + P | 93 | 30 | 770 | 130 |
| 16 | F + P | 92 | 30 | 770 | 120 |
| 17 | F + P | 90 | 40 | 760 | 120 |
| 18 | F + P | 91 | 30 | 765 | 125 |
| 19 | F + P | 92 | 25 | 770 | 120 |
| 20 | F + P + B | 80 | 5 | 760 | 100 |
| 21 | F + P | 91 | 15 | 770 | 105 |
| 22 | F + P + B | 83 | 25 | 735 | 95 |
| 23 | F + P | 91 | 30 | 740 | 95 |
| 24 | F + P | 92 | 25 | 740 | 100 |
| 25 | F + P | 90 | 30 | 750 | 110 |
| 26 | F + P | 93 | 30 | 765 | 95 |
| 27 | F + P | 90 | 30 | 750 | 90 |
| 28 | F + P | 94 | 13 | 770 | 100 |
| 29 | F + P + B | 82 | 30 | 745 | 100 |
| 30 | F + P + B | 80 | 30 | 740 | 95 |
| 31 | F + P | 82 | 30 | 735 | 90 |
| 32 | F + P | 83 | 20 | 745 | 95 |
| 33 | F + P | 90 | 25 | 740 | 90 |
| 34 | F + P | 93 | 25 | 735 | 90 |
| 35 | F + P | 92 | 5 | 775 | 95 |
| 36 | F + P | 90 | 10 | 750 | 100 |
| 37 | F + P | 90 | 3 | 770 | 105 |
| 38 | F + P + B | 75 | 35 | 740 | 95 |

In addition, on the observation surface described above, its fraction of pearlite (%) was determined by the method described above. Results of the determination are shown in Table 2.

[Composite-Inclusions Ratio Ra]

On the steel bars for induction hardening, their composite-inclusion ratios Ra (%) were measured by the method described above. $Al_2O_3$ inclusions and composite inclusions each having a circle equivalent diameter of 10 μm or more were identified, and their composite-inclusion ratios Ra (%) were determined by the method described above. Results of the determination are shown in Table 2.

[Evaluation Test]

[Making Surface Fatigue Strength Test Specimen]

A surface fatigue strength test specimen simulating a machine component was made by the following method. For each test number, a steel bar was heated at 1200° C. for 30 minutes. Next, the steel bar was subjected to hot forging with a finishing temperature set at 950° C. or more to be produced into a round bar having a diameter of 35 mm. The round bar having a diameter of 35 mm was machined into the surface fatigue strength test specimen in a form of a small roller specimen. Specifically, small roller specimens for a roller-pitting test illustrated in FIG. 1 were made for each test number (dimensions shown in FIG. 1 are in millimeters).

Each of the made test specimens was subjected to induction hardening. Specifically, a peripheral surface FP of the small roller specimen (a portion having a diameter of 26 mm) was subjected to the induction hardening treatment using an induction hardening apparatus with 20 kW output and 50 kHz frequency and for a heating time adjusted within a range of 5 to 10 seconds such that its hardened layer depth becomes 1.5 mm. At that time, a heating temperature of a surface of the small roller specimen was 900 to 1100° C. Thereafter, an ordinary heat treatment furnace was used to perform tempering at 160° C. for one hour.

[Vickers Hardness Test]

After the induction hardening, for each test number, the peripheral surface FP (portion having a diameter of 26 mm) of the corresponding small roller specimen were measured in Vickers hardness. Specifically, a Vickers hardness test conforming to JIS Z 2244(2009) was performed at desired three points on each of the peripheral surface of the small roller specimen. At this point, a test force was set at 9.8 N. An average value of resulting Vickers hardnesses was defined as a Vickers hardness (HV) of the each test number. The measurement results are shown in Table 2.

[Surface Fatigue Strength Test]

Figure 2:
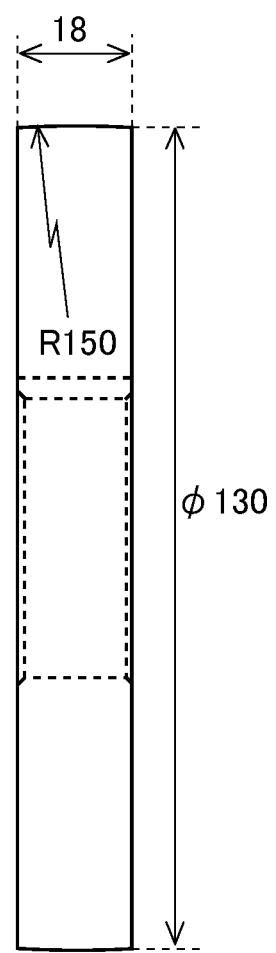
FIG. 2 is a front view of a large roller specimen used in a roller-pitting test in Examples.

The roller-pitting test was performed to determine surface fatigue strengths. The roller-pitting test was performed in a form of combination of the above small roller specimen and a large roller specimen. FIG. 2 is a front view of the large roller specimen (dimensions shown in FIG. 2 are in millimeters). The large roller specimen is made of steel satisfying specifications of JIS Standard SCM420H and made through common producing steps, that is, steps of normalizing, machining the test specimen, eutectoid carburizing using a gas carburizing furnace, low temperature tempering, and polishing. Conditions for the roller-pitting test are as follows.

Test machine: Roller-pitting test machine
Test specimens: Small roller specimen (26 mm in diameter),
Large roller specimen (130 mm in diameter), Contact portion of 150 mmR
Maximum surface pressure: 3600 MPa
Number of tests: 6
Slip Factor: −40%
Rotational speed of small roller: 2000 rpm
Peripheral speed: small roller: 2.72 m/s, large roller: 3.81 m/s
Lubricant temperature: 90° C.
Oil used: Oil for automatic transmissions For each test number, a number of tests was six in the roller-pitting test. After the test, S-N curves with its ordinate representing interfacial pressure and its abscissa representing number of repetitions until occurrence of pitting were created. For the test number, a highest of interfacial pressures at which pitting did not occur until a number of repetitions of $2.0 \times 10^7$ was determined as its surface fatigue strength. A case where a largest of damaged spots on a surface of the small roller specimen had an area of 1 mm$^2$ or more was determined as the occurrence of pitting.

Table 2 shows surface fatigue strengths resulting from the test. For the surface fatigue strengths in Table 2, a surface fatigue strength of the test number 20 was used as a reference value (100%). A surface fatigue strength of each test number is shown in a form of a ratio to the reference value (%). A surface fatigue strength of 115% or more was determined that an excellent surface fatigue strength was obtained.

[Results of Evaluation]

Referring to Table 1 and Table 2, as to the steel of the test numbers 1 to 19, their chemical compositions were appropriate and satisfied Formulae (1) to (3). In addition, the producing conditions in the refining step were appropriate, the average cooling rate after the finish rolling were also appropriate. Therefore, their micro-structures were ferrite-pearlite micro structures, and their fractions of pearlite were 85% or more. In addition, their composite-inclusion ratios Ra were 20% or more. In addition, their Vickers hardnesses were 750 HV or more. As a result, their surface fatigue strengths were 115% or more, indicating that excellent surface fatigue strengths were obtained.

In contrast, as to the test number 21, its content of Si was excessively low. Accordingly, its $Al_2O_3$ inclusions cannot be reformed into composite inclusions sufficiently, and its composite-inclusion ratio Ra was less than 20%. As a result, its surface fatigue strength was less than 115%, indicating that an excellent surface fatigue strength was not obtained.

As to the test number 22, its content of Mn was excessively high. Therefore, bainite is produced in its microstructure after the rolling, and its fraction of pearlite was less than 85%. As a result, a Vickers hardness of its steel material subjected to the induction hardening was less than 750 HV. As a result, its surface fatigue strength was less than 115%, indicating that an excellent surface fatigue strength was not obtained.

As to the test number 23, its content of Mn was excessively low. Accordingly, a strength of its steel material subjected to the induction hardening was low, and a Vickers hardness of its steel material subjected to the induction hardening was less than 750 HV. As a result, its surface fatigue strength was less than 115%, indicating that an excellent surface fatigue strength was not obtained.

As to the test number 24, its content of Cr was excessively high. Accordingly, a strength of its steel material subjected to the induction hardening was low, and a Vickers hardness of its steel material subjected to the induction hardening was less than 750 HV. As a result, its surface fatigue strength was less than 115%, indicating that an excellent surface fatigue strength was not obtained. This is considered to be due to insufficient dissolution of cementite in the induction hardening, which failed to uniformly produce martensite through the hardening.

As to the test number 25, its content of Al was excessively high. As a result, its surface fatigue strength was less than 115%, indicating that an excellent surface fatigue strength was not obtained. This is considered to be due to formation of coarse $Al_2O_3$ inclusions in a large amount.

As to the test number 26, its content of Al was excessively low. As a result, its surface fatigue strength was less than 115%, indicating that an excellent surface fatigue strength was not obtained. This is considered to be due to coarsening of grains in the induction hardening.

As to the test number 27, its content of Ca was excessively high. As a result, its surface fatigue strength was less than 115%, indicating that an excellent surface fatigue strength was not obtained. This is considered to be due to formation of coarse oxide inclusions.

As to the test number 28, its content of Ca was excessively low. Accordingly, its composite-inclusion ratio Ra was less than 20%. As a result, its surface fatigue strength was less than 115%, indicating that an excellent surface fatigue strength was not obtained.

As to the test numbers 29 and 30, their Fn1s failed to satisfy Formula (1). Accordingly, bainite was produced in their micro-structures. Accordingly, their fractions of pearlite were less than 85%. As a result, imperfect hardening occurred, with the result that their Vickers hardnesses were less than 750 HV. As a result, its surface fatigue strength was less than 115%, indicating that an excellent surface fatigue strength was not obtained.

As to the test numbers 31 and 32, their Fn2s failed to satisfy Formula (2). Accordingly, their fractions of pearlite were less than 85%. As a result, imperfect hardening occurred, with the result that their Vickers hardnesses were less than 750 HV. As a result, its surface fatigue strength was less than 115%, indicating that an excellent surface fatigue strength was not obtained.

As to the test numbers 33 and 34, their Fn3s failed to satisfy Formula (3). Accordingly, their Vickers hardnesses were less than 750 HV. As a result, its surface fatigue strength was less than 115%, indicating that an excellent surface fatigue strength was not obtained. This is considered to be due to undissolved cementite remaining during the induction hardening.

As to the test numbers 35 to 36, their chemical compositions were appropriate and satisfied Formulae (1) to (3). In addition, its average cooling rate after the finish rolling was also appropriate. However, their is/τ (retention time/mixing time) were low in the heating retaining step in the refining step. Accordingly, their composite-inclusion ratios Ra were less than 20%. As a result, its surface fatigue strength was less than 115%, indicating that an excellent surface fatigue strength was not obtained.

As to the test number 37, its chemical composition was appropriate and satisfied Formulae (1) to (3). However, its order of adding Al, Si, and Ca was not appropriate. Accordingly, their composite-inclusion ratios Ra were less than 20%. As a result, its surface fatigue strength was less than 115%, indicating that an excellent surface fatigue strength was not obtained.

As to the test number 38, its chemical composition was appropriate and satisfied Formulae (1) to (3). However, its average cooling rate after the finish rolling was excessively high. Accordingly, bainite was produced in their microstructures. Accordingly, their fractions of pearlite were less than 85%. As a result, imperfect hardening occurred, with the result that their Vickers hardnesses were less than 750 HV. As a result, its surface fatigue strength was less than 115%, indicating that an excellent surface fatigue strength was not obtained.

The embodiment according to the present invention has been described above. However, the aforementioned embodiment is merely an example for practicing the present invention. Therefore, the present invention is not limited to the aforementioned embodiment, and the aforementioned embodiment can be modified and implemented as appropriate without departing from the scope of the present invention.

The invention claimed is:

1. A steel for induction hardening comprising a chemical composition consisting of, in mass percent:
C: 0.58 to 0.68%;
Si: 0.70 to 1.40%;
Mn: 0.20 to 1.40%;
Al: 0.005 to 0.060%;
N: 0.0020 to 0.0080%;
Ca: 0.0005 to 0.005%;
Cr: 0 to 0.15%;
Cu: 0 to 0.50%;
Ni: 0 to 0.30%;
Mo: 0 to 0.20%;
B: 0 to 0.0040%; and
Ti: 0 to 0.050%;
with the balance being Fe and impurities,
the impurities including:
P: less than 0.020%;
S: less than 0.020%;
O: 0.0015% or less;
V: less than 0.01%; and
Nb: less than 0.01%,
and satisfying Formulae (1) to (3),
wherein
a steel microstructure is made up of ferrite and pearlite, where an area fraction of the pearlite is 85% or more, and
in the steel, a ratio of a number of composite inclusions to a total number of $Al_2O_3$ inclusions and the composite inclusions is 20% or more, and the composite inclusions contain, in mass percent, 2.0% or more of $SiO_2$ and 2.0% or more of CaO, with the 99% or more of the balance being $Al_2O_3$;

$$C+Si/7+Mn/5+Cr/9+Mo/2.5 \leq 1.05 \qquad (1)$$

$$C+Si/10+Mn/20+Cr/25 \geq 0.70 \qquad (2)$$

$$Cr/Si \leq 0.20 \qquad (3)$$

where, symbols of elements in Formulae (1) to (3) are to be substituted by contents of corresponding elements (mass percent).

2. The steel for induction hardening according to claim 1, wherein the chemical composition contains one or more types selected from the group consisting of:
Cr: 0.05 to 0.15%;
Cu: 0.03 to 0.50%;
Ni: 0.03 to 0.30%;
Mo: 0.01 to 0.20%; and
B: 0.0003 to 0.0040%.

3. The steel for induction hardening according to claim 1, wherein the chemical composition contains Ti: 0.010 to 0.050%.

4. The steel for induction hardening according to claim 2, wherein the chemical composition contains Ti: 0.010 to 0.050%.

* * * * *

UNITED STATES PATENT AND TRADEMARK OFFICE
CERTIFICATE OF CORRECTION

PATENT NO. : 10,808,304 B2  
APPLICATION NO. : 16/316479  
DATED : October 20, 2020  
INVENTOR(S) : Yutaka Neishi et al.

Page 1 of 1

It is certified that error appears in the above-identified patent and that said Letters Patent is hereby corrected as shown below:

In the Claims

In Column 22, Claim 1, Line 15:
Please delete: "0:" and insert -- O: --

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*